United States Patent [19]

Ferez

[11] Patent Number: 5,492,349
[45] Date of Patent: Feb. 20, 1996

[54] ROWING LOCOMOTION DEVICE

[76] Inventor: Marcio C. Ferez, 777 E. 25th St., Suite 206, Hialeah, Fla. 33013

[21] Appl. No.: 262,282
[22] Filed: Jun. 20, 1994
[51] Int. Cl.⁶ ............................. B62M 1/16; B62M 11/04
[52] U.S. Cl. .................... 280/248; 280/240; 280/238; 474/73; 192/48.91; 192/48.92
[58] Field of Search .................... 280/236, 237, 280/238, 240, 242.1, 244, 247, 248, 252, 253, 256, 257, 263, 267; 474/69, 73, 74, 76; 192/48.91, 48.92, 145, 67 R, 96

[56] References Cited

U.S. PATENT DOCUMENTS

| | | | |
|---|---|---|---|
| 474,279 | 3/1892 | Arnold | 280/248 X |
| 535,593 | 3/1895 | Mann | 280/240 |
| 891,872 | 2/1907 | Smith | 280/248 |
| 941,121 | 11/1909 | Worthington | 280/248 X |
| 2,198,942 | 4/1940 | Leggitt | 280/248 X |
| 2,541,872 | 2/1951 | Hendricks | 192/48.91 |
| 5,209,506 | 5/1993 | Klopfenstein | 280/240 |

Primary Examiner—Brian L. Johnson
Assistant Examiner—F. Zeender

[57] ABSTRACT

An improved self-propelled wagon of the type having a body including front and rear ends, a front axle pivotally mounted to the front end, a rear axle mounted to the rear end, and a propelling means for transmitting the human force of the user to the rear axle. The improvement comprises a sliding gear assembly that includes a hollow tube having proximal and distal ends, a small spur sprocket freely rotably mounted at the proximal end of the hollow tube and a large spur sprocket means freely rotably mounted at said distal end of the hollow tube. The rotation of the sprockets driving corresponding chains trained thereon and causing the rotation of the rear axle. The sliding gear assembly is adapted such that a user may adjust the sliding gear assembly to selectively intermesh with, and turn, the small spur sprocket or the large spur sprocket. The improvement also comprises a steering assembly having a tube, horizontal rod, vertical rod, a fork and rod. The vertical rod having handle bars mounted on the upper end and rotating it, the tube journaling the vertical rod. The vertical rod in turn rotating the horizontal rod. The horizontal rod being held in longitudinal alignment with the fork until turned by the rotation of the handle bars. The reciprocating rowing motion of the propelling means does not alter the longitudinal alignment of the horizontal rod with the fork. In addition, the horizontal rod is connected to the front axle by a rod, the rod causing the front axle to pivotally turn when the handle bars are turned by the user.

5 Claims, 6 Drawing Sheets

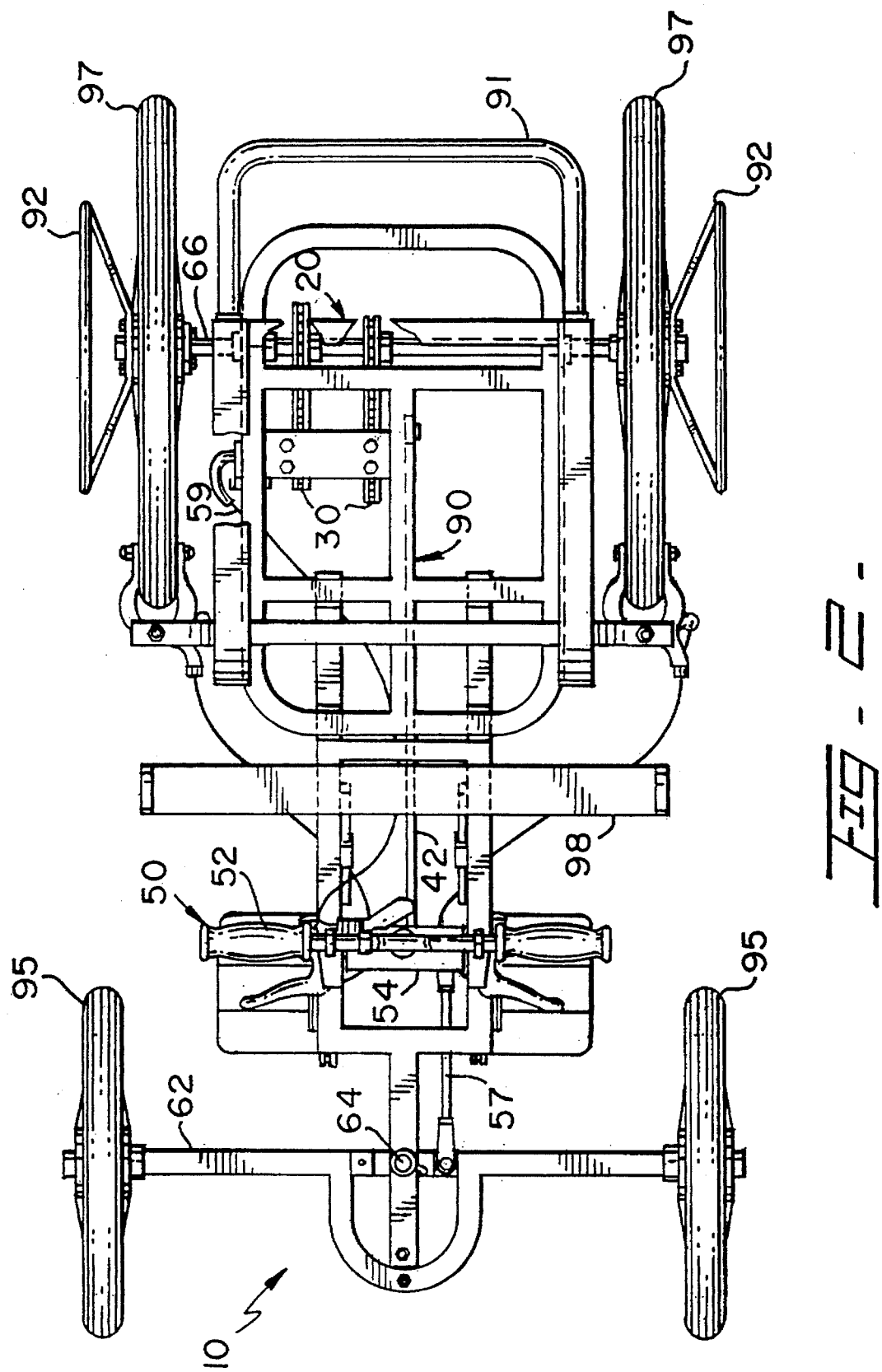

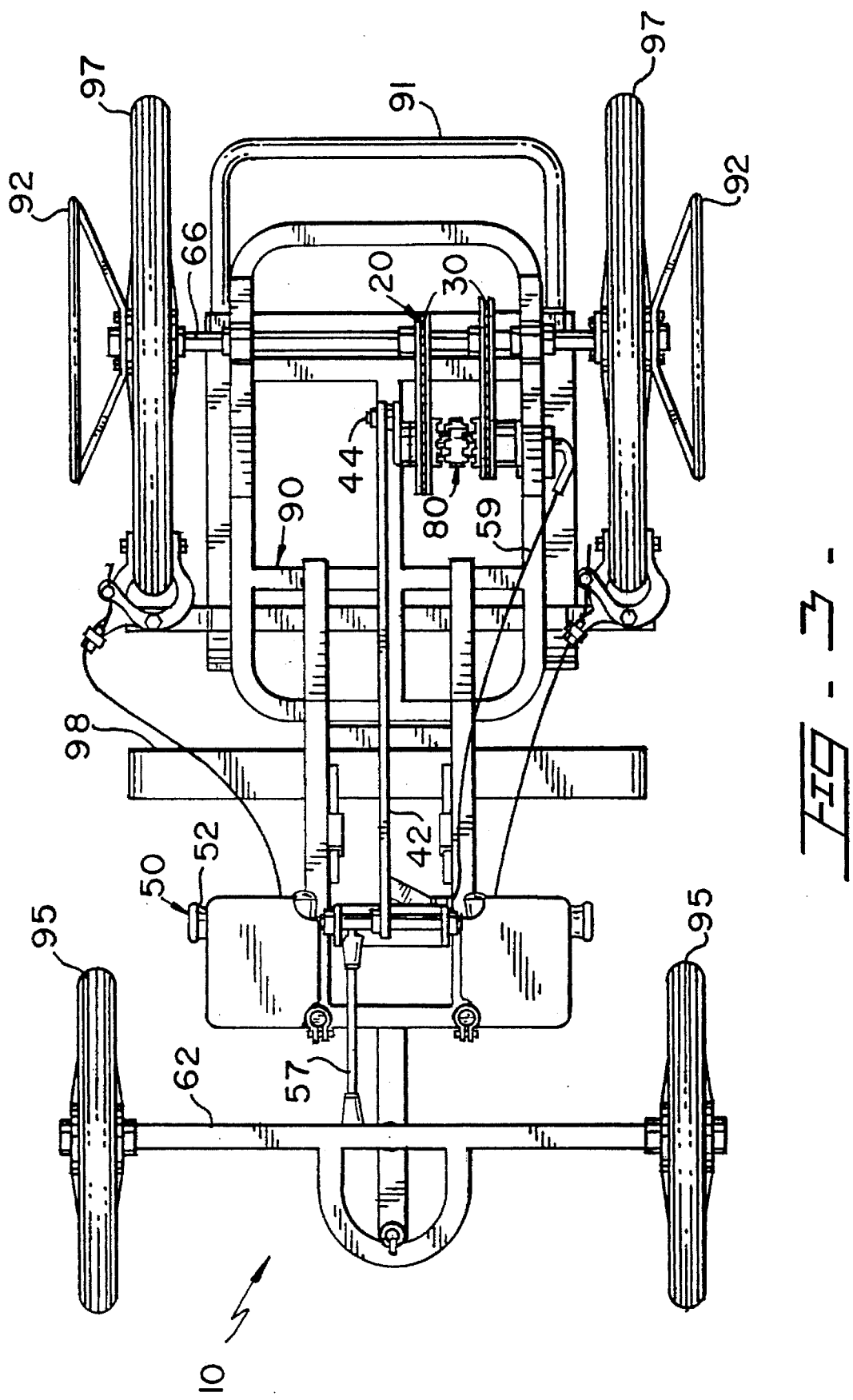
FIG - 3 -

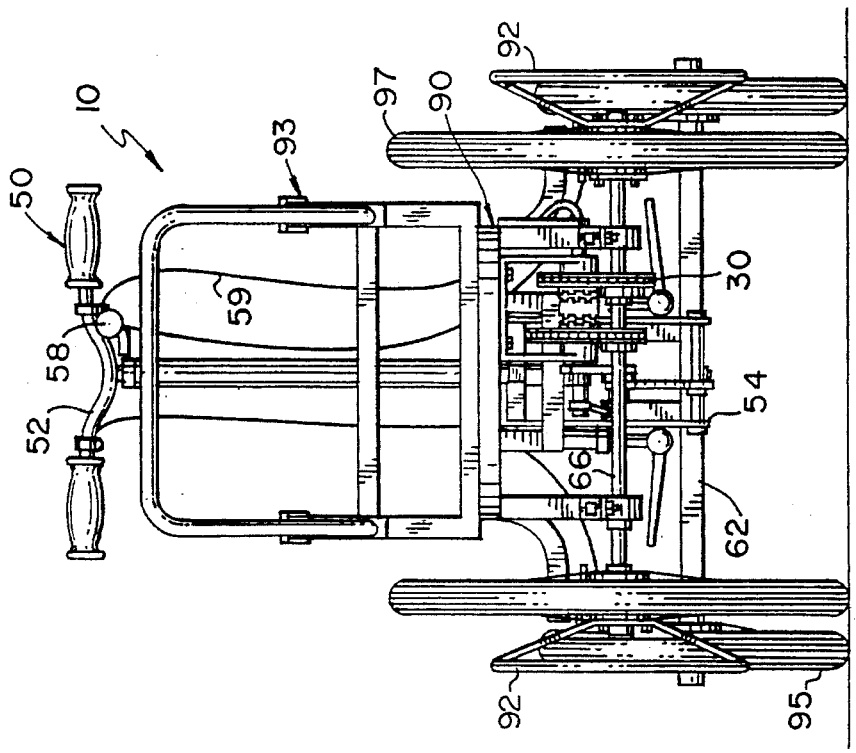
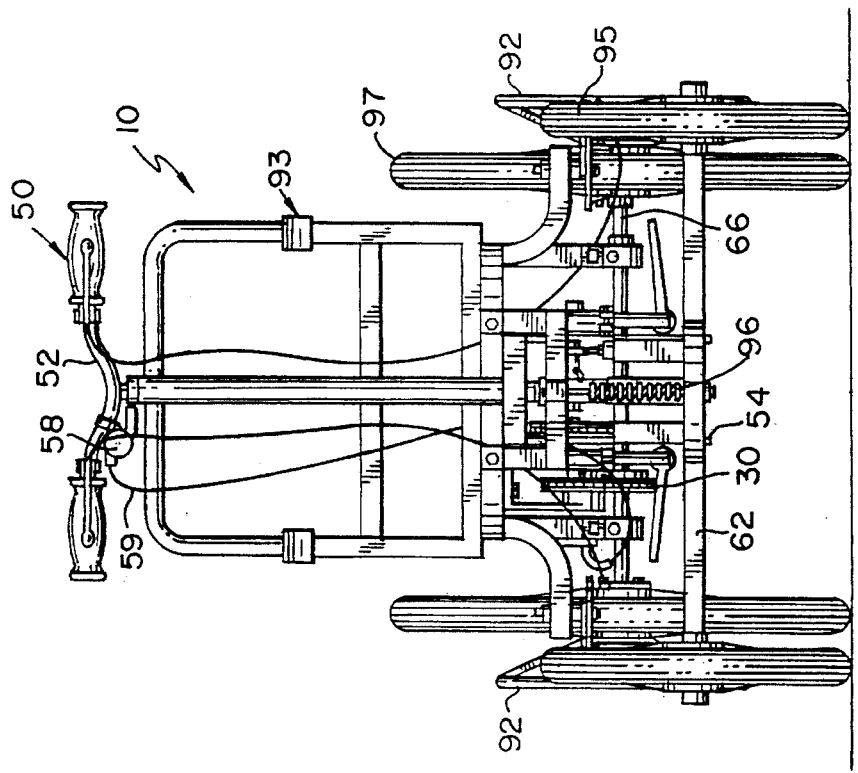

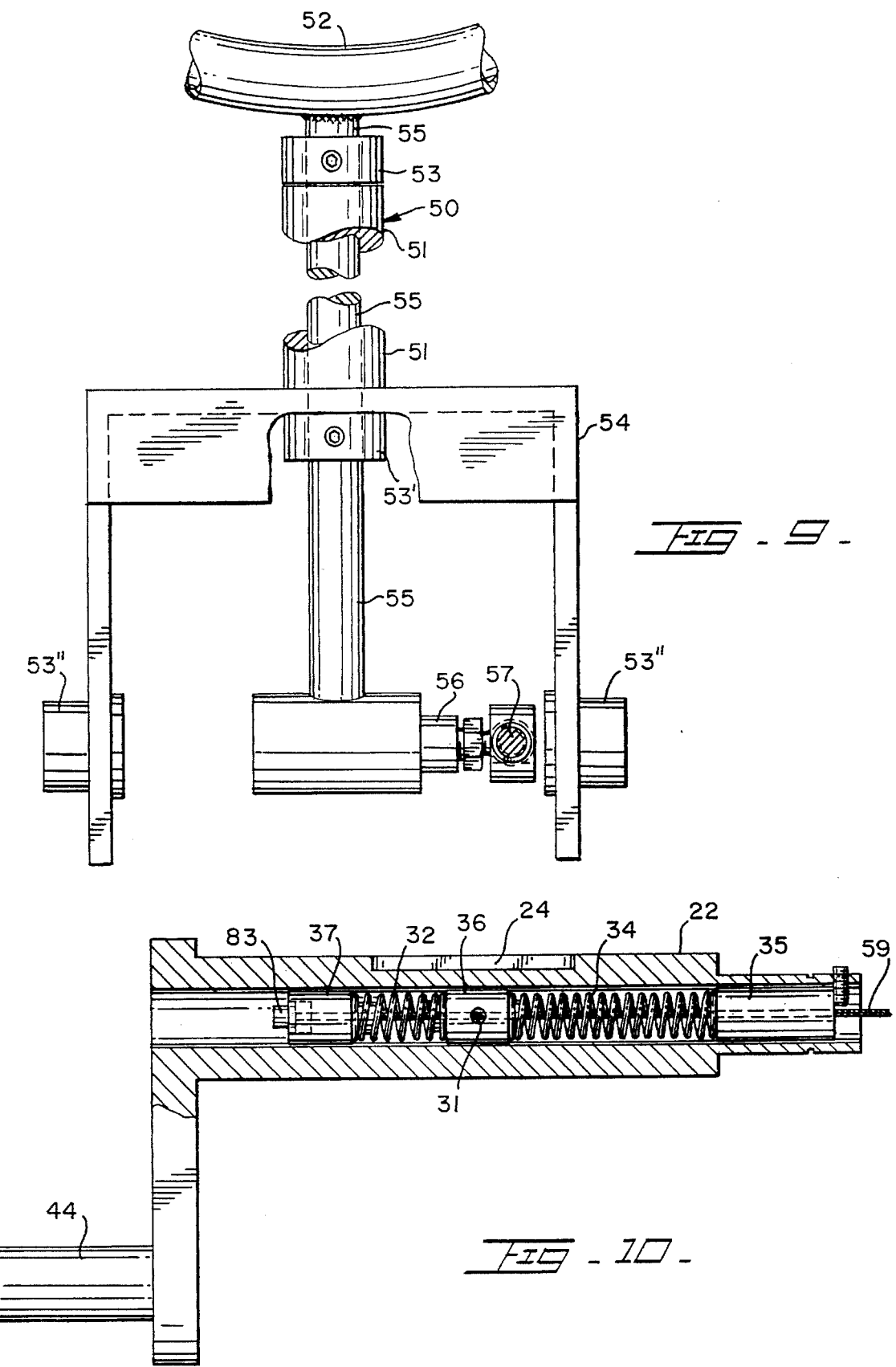

5,492,349

ROWING LOCOMOTION DEVICE

BACKGROUND OF THE INVENTION

1. Field of the Invention

The present invention relates to locomotion devices, and more particularly, to a device which permits a user to propel the device with both the forward and backward strokes of the steering/propulsion mechanism and also to steer without requiring the user to employ his or her lower extremities.

2. Description of the Related Art

Applicant believes that the closest reference corresponds to U.S. Pat. No. 2,541,872 issued to Hendricks. However, it differs from the present invention because it does not utilize a similar shifting mechanism.

Other patents describing the closest subject matter provide for a number of more or less complicated features that fail to solve the problem in an efficient and economical way. None of these patents suggest the novel features of the present invention.

SUMMARY OF THE INVENTION

It is one of the primary objects of the present invention to provide a gearing system to permit a user to efficiently operate a device on both inclined and flat surfaces.

It is still another objective of the present invention to provide a device that can operate in different gears in both forward and reverse.

It is one of the objects of this present invention to provide a device that permits a user to coast by disengaging the drive wheels from the sliding gear assembly.

It is one of the objects of this present invention to provide a device which can operate in both forward and reverse.

It is one of the primary objects of the present invention to provide a device that does not require the driver to use his lower extremities to steer or propel the wagon.

It is yet another object of the present invention to provide a steering assembly which allows a user to propel a device by moving the handle bars in a reciprocating fashion while at the same time allowing the user to steer the device by rotating the same handle bars.

It is yet another object of this present invention to provide such a device that is inexpensive to manufacture and maintain while retaining its effectiveness.

Further objects of the invention will be brought out in the following part of the disclosure document, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 represents a top view of the present invention.

FIG. 3 shows a bottom view of the present invention.

FIG. 4 depicts a front view of the present invention.

FIG. 5 illustrates a rear view of the present invention.

FIG. 9 depicts a partial front view of the steering assembly of the present invention.

FIG. 10 shows an enlarged partial view of the sliding gear assembly of the present invention.

DETAILED DESCRIPTION OF THE PREFERRED EMBODIMENT

Figure 1:
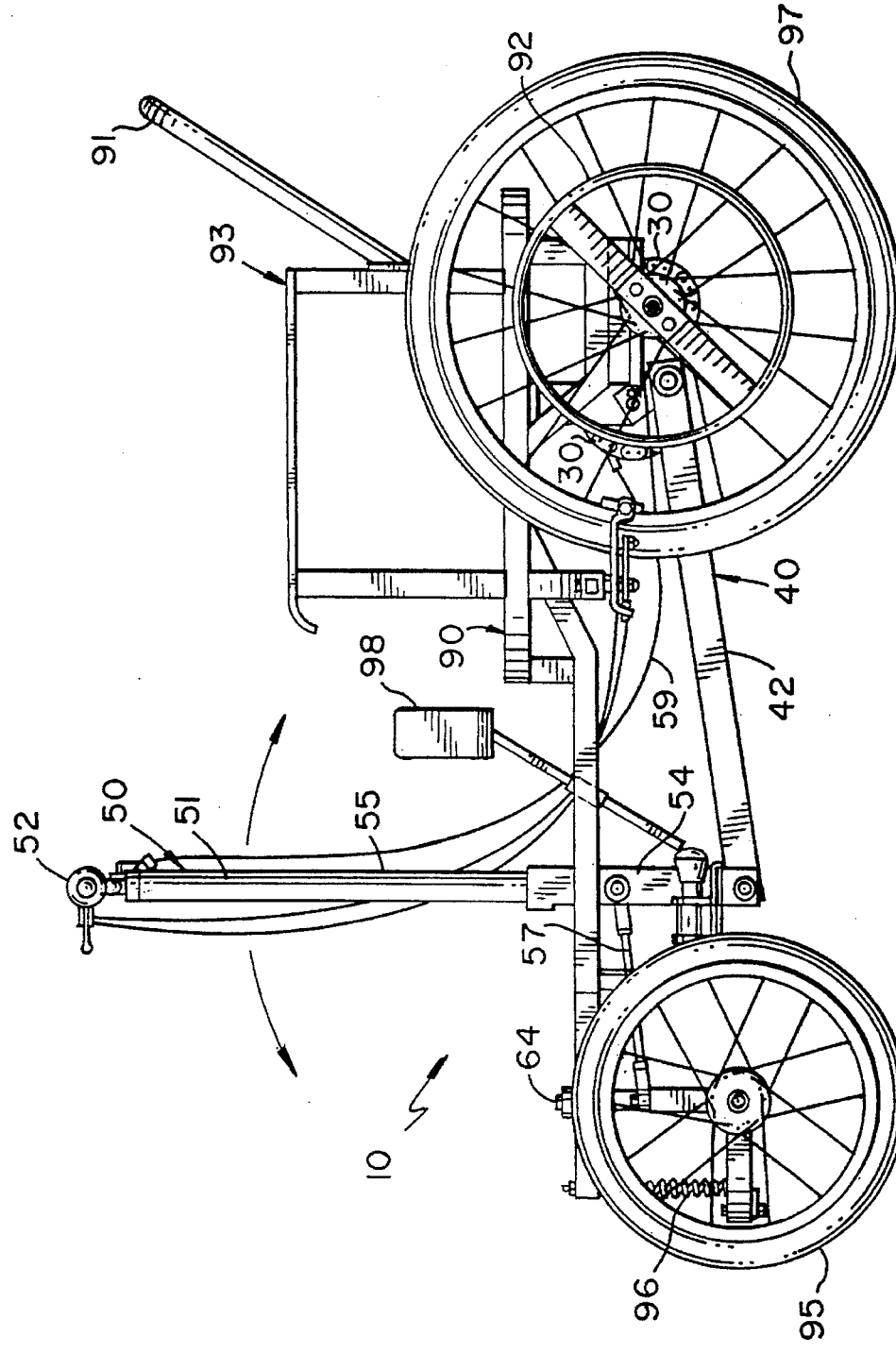
FIG. 1 depicts a side view of the present invention.

Referring now to the drawings, where the present invention is generally referred to with numeral 10, it can be observed that it basically includes drive assembly 20, connecting assembly 40, steering assembly 50 and sliding gear assembly 80.

Referring now to FIGS. 1, 2, 6, 7, 8 and 10 it can be seen that drive assembly 20 comprises hollow tube 22, small spur sprocket 26, large spur sprocket 28, chains 30, short spring 32, long spring 34, proximal cylinder 35, central cylinder 36, distal cylinder 37, wedge 38 and bearings 39.

Figure 6:
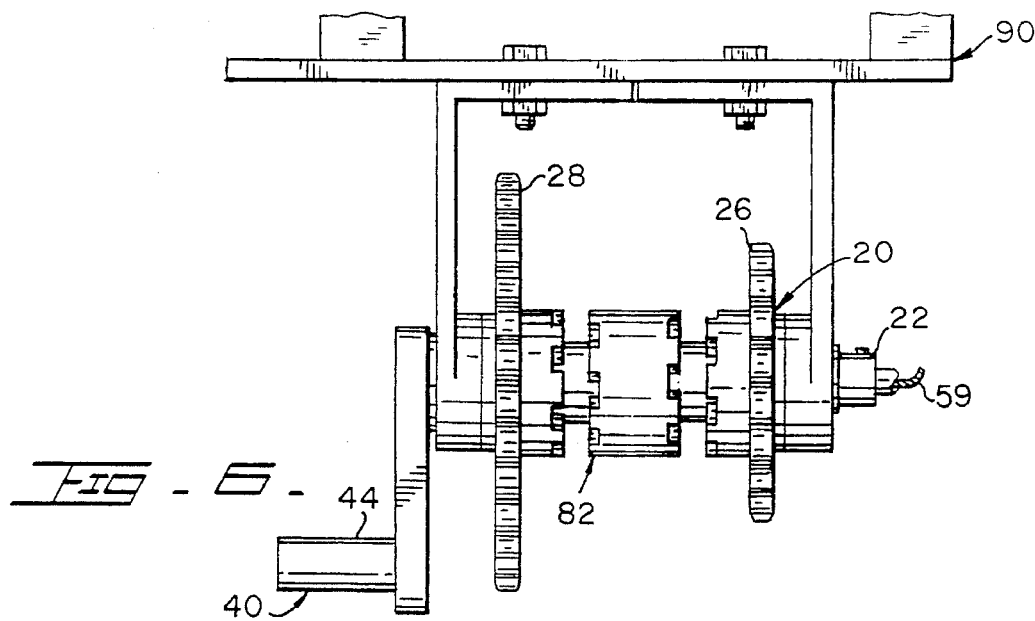
FIG. 6 represents the sliding gear assembly of the present invention.
Figure 7:
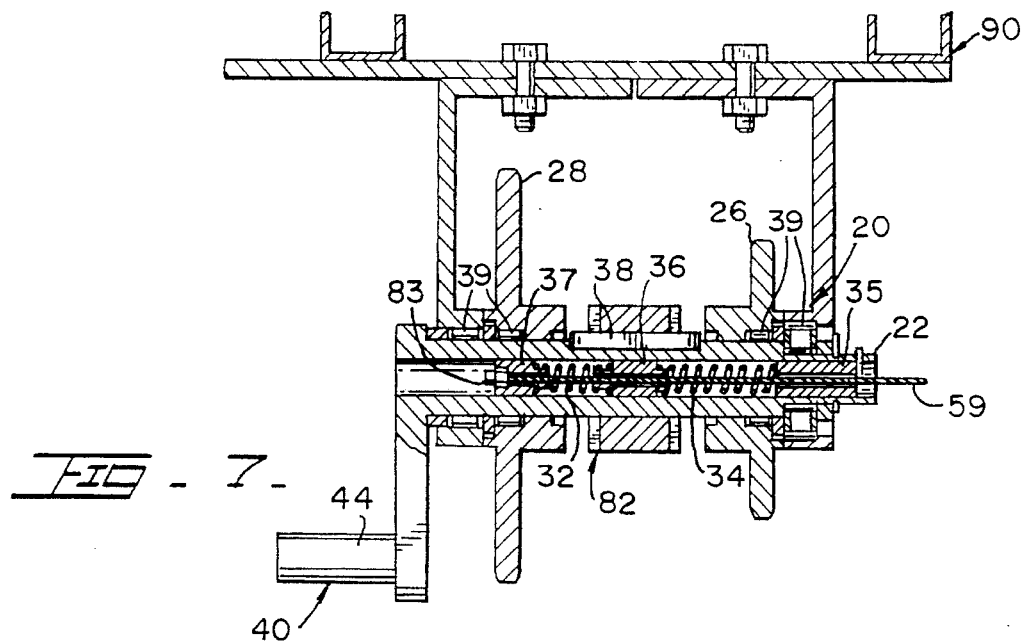
FIG. 7 shows a partial cross-sectional view of the sliding gear assembly shown in FIG. 6.

Referring now to FIGS. 3, 5, 6 and 7, it can be seen that a user wishing to change to the gearing between the rear axle 66 and the drive assembly 20 will change the position of gear shifter 58. Gear shifter 58 changes the position of cable 59, which in turn, changes the position of sliding gear assembly 80. As best seen in FIGS. 3 and 7, when a user desires a higher gear ratio a user adjusts gear shifter 58 such that sliding gear assembly 80 engages large spur sprocket 28. Conversely, when a user desires a smaller gear ratio, sliding gear assembly 80 is adjusted so that it engages small spur sprocket 26. When a user wishes to coast, sliding gear assembly 80 is positioned so that it does not engage either large spur sprocket 28 or small spur sprocket 26, as best seen in FIG. 6 and 7.

Referring again to FIGS. 1, 2, 3, 6 and 7, it can be seen that a user drives rear axle 66 by moving steering assembly 50 in a reciprocating rowing motion. Steering assembly 50 in turn drives main bar 42, which is part of connecting assembly 40. Main bar 42 is pivotally connected to connecting bar 44 and rotates hollow tube 22. The position of sliding gear 82 can be altered by changing the position of cable 59. Cable 59 has a first end which is attached to gear shifter 58, as best seen in FIG. 2. The second end of cable 59 passes through the length of hollow tube 22.

Referring now to FIG. 10, it can be seen that the second end of cable 59 is fastened in place by cable holder 83. Distal cylinder 37 journals cable 59 and its first end abuts cable holder 83. The second end of distal cylinder 37 contacts short spring 32, which, in turn contacts the distal end of central cylinder 36. The proximal end of central cylinder 36 contacts the first end of long spring 34. The second end of long spring 34 abuts proximal cylinder 35 at its first end. Cable 59 is journaled by distal cylinder 37, central cylinder 36 and proximal cylinder 35. As best seen in FIGS. 7 and 10, that cable 59 is held in a fixed relative position to distal cylinder 37 by cable holder 83, and cannot be pulled therethrough. Because short spring 32 is stronger than long spring 34 gear shifter 58 must be employed to change the position of cable 59 and, in turn, move sliding gear 82. Large spur sprocket 28 and small spur sprocket 26 are mounted to the exterior of hollow tube 22 so that they freely rotate. Sprockets 26 and 28 communicate with rear axle 66 by means of chains 30.

Figure 8:
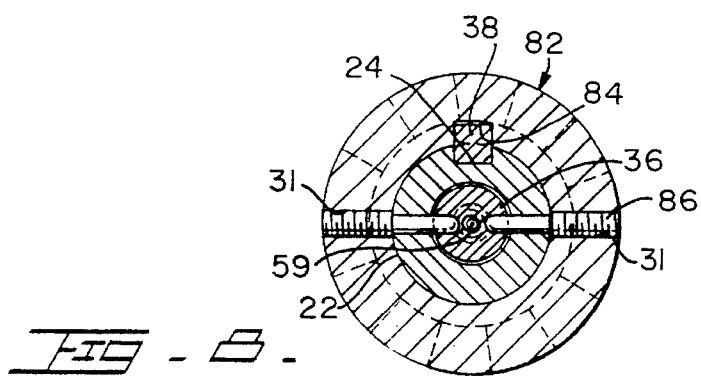
FIG. 8 illustrates another partial cross-sectional view of the sliding gear assembly.

As best seen in FIGS. 7 and 8, when a user makes a reciprocating motion with steering mechanism 50 this moves main bar 42, which in turn rotates connecting bar 44. The rotation of connecting bar 44 turns hollow tube 22. Large spur sprocket 28 and small spur sprocket 26 freely rotate and are not directly driven by the rotation of hollow tube 22.

As best seen in FIG. 8, hollow tube 22 has slots 31 therethrough and outer groove 24 thereon. Hollow tube 22 is journaled by sliding gear 82. Outer groove 24, of hollow tube 22, and inner groove 84 of sliding gear 82, cooperatively hold wedge 38 and communicate the rotation of hollow tube 22 to sliding gear 82. Sliding gear 82 is also coupled to hollow tube 22 by pins 86. Pins 86 extend through sliding gear 82 and pass through slots 31. Slots 31 extend along the longitudinal axis of hollow tube 22. Slots 31 and pins 86 cooperatively allow sliding gear 82 to translate the length of slots 31. Slots 31 are of sufficient length such that the opposing faces of sliding gear 82 can, depending on the gear ratio selected by the user, interlock with either large spur sprocket 28 or small spur sprocket 26.

When a user desires a higher gear ratio, the gear shift 58 is positioned such that sliding gear 82, of sliding gear assembly 80, contacts large spur sprocket 28. Pins 86 hold sliding gear 82 in a fixed position relative to hollow tube 22 and transmit the rotation of hollow tube 22 to sliding gear 82 in cooperation with outer groove 24, inner groove 84 and wedge 38. When sliding gear 82 contacts large spur sprocket 28 this gear turns and drives chain 30 and rear axle 66. Similarly, when a user desires a lesser gear ratio, sliding gear 82 can be positioned so that it contacts small spur sprocket 26 and thereby driving rear axle 66.

A user wishing to reposition sliding gear 82 does so by changing the position of cable 59. When sliding gear 82 is contacting large spur sprocket 28, cable 59 is in a position such that pins 86 abut the distal end of slots 31. As can best be seen in FIGS. 6, 7 and 10, it is apparent that cable 59, long spring 34 and short spring 32 can cooperatively translate central cylinder 36 substantially along the length of hollow cylinder 22. However, the motion of sliding gear 82 is cooperatively constrained to the length of slots 31 by pins 86. When a user adjusts cable 59 such that its second end is pulled towards small spur sprocket, short spring 32 and long spring 34 are compressed. Because these springs now exert an unequal force on central cylinder 36, central cylinder 36 is urged towards small spur sprocket 26 as seen in FIGS. 6, 7 and 10. When a user desires a higher gear ratio, cable 59 is positioned such that the force exerted by long spring 34, on central cylinder 36, is greater than that exerted by short spring 32. This imbalance in forces causes central cylinder 36, and therefore sliding gear 82, to translate such that one face of sliding gear 82 contacts large spur sprocket 28. When a user desires to coast he or she can adjust cable 59 so that the forces exerted on central cylinder 36 are equal. This translates central cylinder 36 into a position so that it does not contact either small spur sprocket 26 or large spur sprocket 28. Rear axle 66 continues to turn freely, but a user does not have to move steering assembly 50 in a reciprocating rowing motion. A user would typically coast when going down hill and allow the pull of gravity to accelerate device 10.

As shown in FIGS. 1, 3,4, and 9 it can be observed that steering assembly 50 includes basically, tube 51, handle bars 52, shaft collars 53 and 53', fork 54, vertical rod 55, horizontal rod 56 and rod 57. As best seen in FIG. 9, tube 51 journals vertical rod 55 and is mounted to fork 54. Vertical rod 55 has rotating handle bar 52 mounted on its upper end.

Tube 51 is connected to fork 54 which is, in turn, mounted to frame 90 and drives connecting assembly 40. Rod 57 has a first and second end. The first end being removably attached to horizontal rod 56, through a universal joint, and the second end is removably attached to front axle 62 through a second universal joint. Front wheels 95 are mounted freewheeling on front axle 62. Front axle 62 is attached to frame 90 by a pivot bolt 64 permitting front axle 62 to rotate. A user changes the direction the device 10 is moving in by rotating handle bar 52. Handle bar 52 rotates vertical rod 55 and, in turn, horizontal rod 56. The rotation of horizontal rod 56 moves rod 57 and causes front axle 62 to rotate on pivot bolt 64. When front axle 62 rotates front wheels 95 change direction, thereby changing the direction of motion of device 10. Drive assembly 20 is driven by the reciprocating motion of handle bars 52 and forces the rear wheels 97, of device 10, to rotate; thereby moving device 10. As best seen in FIGS. 2 and 9, it is apparent that shaft collars 53 and 53' cooperatively maintain the vertical position of vertical rod 55 with tube 51 while a user is moving steering assembly 50 in a reciprocating rowing fashion in order to propel device 10. Because vertical rod 55 is kept in a fixed vertical position, horizontal rod 56 is also maintained in a fixed vertical alignment with shaft collars 53" of fork 54. It can also be seen that shaft collars 53" cooperatively maintain the longitudinal alignment of horizontal rod 56 in a parallel fixed spaced apart relationship with fork 54, and also a fixed parallel spaced apart relationship with front axle 62, while a user is moving steering assembly 50 in a reciprocating rowing fashion in order to propel device 10. A user may also alter the course of device 10 by turning handle bars 52 in the desired direction of travel. However because shaft collars 53 and 53' cooperatively maintain the longitudinal alignment of horizontal rod 56 the reciprocating rowing motion, of steering assembly 50, does not turn device 10 to the left or right while the user is moving steering assembly 50 in a reciprocation rowing manner unless the user turns handle bars 52.

As best seen in FIGS. 1 and 4, vertical spring 96 restores front axle 62, and handle bars 52, to a position such that device 10 is traveling in a straight line if a user does not exert force to turn handle bars 52. It can also be seen, in FIG. 1, that a user sits in seat 93 when utilizing device 10. In order to facilitate the use of device 10 by users having little or no control of their lower extremities, push handle 91, ring handles 92 and leg support 98 may be employed. Push handle 91 permits another person to more readily push device 10 if it becomes stuck or if the user is unable to continue the reciprocating rowing motion required to propel device 10. Ring handles 92 allow a user to directly turn rear wheels 97. Also, leg support 98 supports the lower extremities of a user and prevents him, or her, from sliding out of seat 93. It has been found that persons having limited use of their lower extremities tend to slide forward in seat 93 when performing the reciprocal rowing motion required to propel device 10. Leg support 98 prevents this sliding motion.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. In a self propelled wagon of the type that includes a body that has front and rear ends, front axle means pivotally mounted on said front end, rear axle means mounted adjacent to said rear end, and propelling means for transmitting the human force of the user to said rear axle means, the improvement comprising:

A) hollow tube means having first and second ends and said hollow tube means being cooperatively engaged with said propelling means to cause the rotation of said hollow tube means;

B) first and second sprocket means mounted to said hollow tube means freewheeling and said first and second sprocket means including first and second chain means respectfully for cooperative engagement with said rear axle means;

C) a gear assembly slidably mounted to said hollow tube means and including a central cylinder mounted within said tube means, including a pin for locking in place said central cylinder to said gear assembly and further including spring means for biasing said gear assembly towards said first end of said hollow tube means for meshing engagement with said first sprocket means; and D) gear shifting means for causing said gear assembly to selectively mesh with said first sprocket means, second sprocket means and to stay detached from said first and second sprocket means.

2. In a self propelled wagon of the type that includes a body that has front and rear ends, front axle means pivotally mounted on said front end, rear axle means mounted adjacent to said rear end, and propelling means for transmitting the human force of the user to said rear axle means, the improvement comprising:

A) elongated tube means having first and second ends;

B) fork means rigidly mounted to said first end and said fork means having two prongs being pivotally mounted to said body;

C) first rod means coaxially housed within said elongated tube means and including third and fourth ends, and said third end extending to a point between said prongs in continuous horizontal alignment with the pivoting points of said prongs throughout the entire pivoting motion of said prongs;

D) second rod means having fifth and sixth ends, said fifth end being perpendicularly and rigidly mounted to said third end;

E) third rod means having seventh and eighth ends said seventh end being pivotally mounted to said sixth end and said eighth end being mounted to said front axle means; and F) handle means mounted to said fourth end so that said handle means can cause said first rod means to rotate at any position of said tube means thereby effectively steering said front axle means.

3. The improvement set forth in claim 2, further including:

A) hollow tube means having first and second ends and said hollow tube means being cooperatively engaged with said propelling means to cause the rotation of said hollow tube means;

B) first and second sprocket means mounted to said hollow tube means freewheeling and said first and second sprocket means including first and second chain means respectfully for cooperative engagement with said rear axle means;

C) a gear assembly slidably mounted to said hollow tube means; and

D) gear shifting means for causing said gear assembly to selectively mesh with said first sprocket means, second sprocket means and to stay detached form said first and second sprocket means.

4. The improvement set forth in claim 3 wherein said gear assembly is mounted to said hollow tube means between said first and second sprocket means, and further including spring means urging said gear assembly towards said first sprocket means for cooperative engagement thereon, and said gear shifting means being selectively actuated by a user to overcome said engagement to said first sprocket means and causing said gear assembly to engage to said second sprocket means and without engagement to either one of said sprocket means in a freewheeling position.

5. The improvement set forth in claim 4 wherein said spring means includes first and second spring members of different compression characteristics and cooperatively mounted within said hollow tube to urge said gear assembly to engage to said first sprocket means, and said first and second spring members sandwiching said gear assembly and being connected to said gear shifting means that transmits the necessary compression force to overcome said first spring member and cause said gear assembly to disengage.

\* \* \* \* \*